US012560312B1

(12) United States Patent
Wang

(10) Patent No.: US 12,560,312 B1
(45) Date of Patent: Feb. 24, 2026

(54) LAMP HEAD CONNECTION STRUCTURE, LAMP HEAD, AND LAMP

(71) Applicant: Dong Guan City Howin Decoration Products Co., LTD, Dongguan (CN)

(72) Inventor: Pinjie Wang, Dongguan (CN)

(73) Assignee: Dong Guan City Howin Decoration Products Co., LTD, Dongguan (CN)

( * ) Notice: Subject to any disclaimer, the term of this patent is extended or adjusted under 35 U.S.C. 154(b) by 0 days.

(21) Appl. No.: 18/926,334

(22) Filed: Oct. 25, 2024

(30) Foreign Application Priority Data

Aug. 20, 2024 (CN) ......................... 202422011101.0

(51) Int. Cl.
*F21V 21/116* (2006.01)
*F16C 11/06* (2006.01)
*F21V 21/30* (2006.01)

(52) U.S. Cl.
CPC ........ *F21V 21/116* (2013.01); *F16C 11/0623* (2013.01); *F21V 21/30* (2013.01)

(58) Field of Classification Search
CPC ........ F21V 21/116; F21V 21/30; F21V 21/29; F16C 11/06; F16M 11/14
See application file for complete search history.

(56) References Cited

U.S. PATENT DOCUMENTS

| | | | | | |
|---|---|---|---|---|---|
| 394,680 | A | * | 12/1888 | Dawes | F21S 8/06 |
| | | | | | 403/138 |
| 2,793,286 | A | * | 5/1957 | Stiffel | F21V 21/116 |
| | | | | | D26/65 |
| 5,221,141 | A | * | 6/1993 | Swanson | F21V 21/30 |
| | | | | | 362/249.05 |
| 5,615,946 | A | * | 4/1997 | Yeh | F21V 21/12 |
| | | | | | 362/388 |
| 2015/0131276 | A1 | * | 5/2015 | Thompson | F21V 21/145 |
| | | | | | 362/371 |
| 2019/0162396 | A1 | * | 5/2019 | Sonneman | F21V 21/30 |
| 2020/0355217 | A1 | * | 11/2020 | Fladhammer | F16C 11/0695 |
| 2022/0018509 | A1 | * | 1/2022 | Fladhammer | F16C 11/0685 |
| 2025/0237372 | A1 | * | 7/2025 | Huijgen | F21V 15/01 |

FOREIGN PATENT DOCUMENTS

| | | | | | |
|---|---|---|---|---|---|
| EP | | 3346148 | A1 | * | 7/2018 ............. F21V 21/00 |

OTHER PUBLICATIONS

Machine translation of Hungendorfer et al., EP-3346148-A1, published Jul. 11, 2018 (Year: 2018).*

* cited by examiner

*Primary Examiner* — William N Harris
(74) *Attorney, Agent, or Firm* — Bayramoglu Law Offices

(57) ABSTRACT

A lamp head connection structure is provided. The lamp head connection structure includes a connection member located on a lamp body and a connection seat located on a lamp head, where the connection seat is provided with a spherical recess structure; the connection member is a sphere that is compatible with the spherical recess structure; the spherical recess structure has an inner diameter larger than a diameter of the sphere and an opening diameter smaller than the diameter of the sphere; the connection member is embedded inside the spherical recess structure; and the lamp head is rotatable 360° relative to the lamp body. A lamp head connection structure, a lamp head, and a lamp are provided, featuring easy disassembly and assembly, space saving, and convenient transportation.

5 Claims, 3 Drawing Sheets

LAMP HEAD CONNECTION STRUCTURE, LAMP HEAD, AND LAMP

CROSS-REFERENCE TO THE RELATED APPLICATIONS

This application is based upon and claims priority to Chinese Patent Application No. 202422011101.0, filed on Aug. 20, 2024, the entire contents of which are incorporated herein by reference.

TECHNICAL FIELD

The present disclosure relates to the technical field of lamps, and in particular to a lamp head connection structure, a lamp head, and a lamp.

BACKGROUND

A common lamp includes a lamp base, a lamp post, and a lamp head. The bead of the lamp is located inside the lamp head. In order to achieve multi-angle illumination, the lamp head needs to be rotatable to various angles within a certain range to meet the needs of users. However, the lamp head rotating structure of existing lamps cannot achieve a detachable connection between the lamp head and the lamp base.

SUMMARY

To solve the above technical problems, the present disclosure provides a lamp head connection structure, a lamp head, and a lamp, featuring easy disassembly and assembly, space saving, and convenient transportation.

A first aspect of an objective of the present disclosure provides a lamp head connection structure, including:

a connection member located on a lamp body; and a connection seat located on a lamp head;

where, the connection seat is provided with a spherical recess structure; the connection member is a sphere that is compatible with the spherical recess structure; the spherical recess structure has an inner diameter larger than a diameter of the sphere and an opening diameter smaller than the diameter of the sphere; and the connection member is embedded inside the spherical recess structure; and the lamp head is rotatable 3600 relative to the lamp body.

Further, the connection seat is embedded inside the lamp head; an outer side of the connection seat is shaped the same as an outer side of a lamp head housing where the connection seat is located.

Further, the connection seat includes a clamping part provided with the spherical recess structure; the spherical recess structure extends from an upper end surface of the clamping part towards a lower part of the clamping part; the lamp head housing is provided with a through-hole with a same contour as an outer peripheral side of an open end of the spherical recess structure; and the clamping part is inserted into the through-hole and connected to the lamp head housing.

Further, the clamping part is a cylinder in shape; and the spherical recess structure extends from an upper end surface of the cylinder towards an interior of the cylinder.

Further, a diameter of the through-hole is larger than the opening diameter of the spherical recess structure; the outer peripheral side of the open end of the spherical recess structure is provided with a limiting part; an inner wall of the through-hole is provided with a support platform; and when the clamping part is inserted into the through-hole, the limiting part is placed on the support platform, and an upper end surface of the limiting part is located inside the outer side of the lamp head housing.

Further, the limiting part is an irregular limiting ring; and the limiting part and the clamping part are integrally formed.

Further, a side wall of the clamping part is provided with multiple notches spaced in a circumferential direction and extending from top to bottom, and the limiting part is correspondingly provided with multiple sets of notches, dividing the limiting part into multiple arc-shaped portions; and the notch of the limiting part is opposite to and communicated with the notch of the clamping part.

Further, the support platform includes multiple arc-shaped platforms; the multiple arc-shaped platforms are arranged at equal intervals in a circumferential direction; a length of the arc-shaped portion is greater than the interval between each two adjacent arc-shaped platforms; an outer wall of each of the arc-shaped portions is provided with a locking member; the locking member is provided with an L-shaped longitudinal section, including a vertical portion parallel to a central axis of the clamping part and a horizontal portion extending away from the clamping part; and the locking member enters into the lamp head from a position between two adjacent arc-shaped platforms and is clamped inside the lamp head housing.

A second aspect of the objective of the present disclosure provides a lamp head, including a lamp head housing, a lamp base, and a light source module located on the lamp base, where the lamp base and the light source module are located inside the lamp head housing; and the lamp head further includes a connection seat located on the lamp head housing; and the connection seat is the connection seat of the above lamp head connection structure.

A third aspect of the objective of the present disclosure provides a lamp, where the lamp is a tree lamp with multiple lamp heads; the tree lamp includes a lamp body and the multiple lamp heads;

the lamp body includes a main lamp post and multiple branch lamp posts; and an end of each of the multiple branch lamp posts is provided with the connection member of the above lamp head connection structure; and the lamp head is the above lamp head; and the lamp body and the lamp head are connected through the above lamp head connection structure.

Compared with the prior art, in the lamp head connection structure of the present disclosure, the lamp body and the lamp head are detachably connected under the prerequisite of a 360° rotation connection between that the lamp head and the lamp body. Before the lamp is put in use, the lamp body and the lamp head can be disassembled for transportation, saving space and facilitating transportation.

In the present disclosure, the lamp head of a KD structure realizes the arbitrarily adjustable illumination angles of the lamp body, and can be separately removed for use as a flashlight, making it convenient to carry. The lamp head can be removed to charge and then installed after charging is complete. The operation is simple, convenient, and practical. The lamp head is suitable for outdoor use and temporary lighting in places without power supply.

Figure 1:
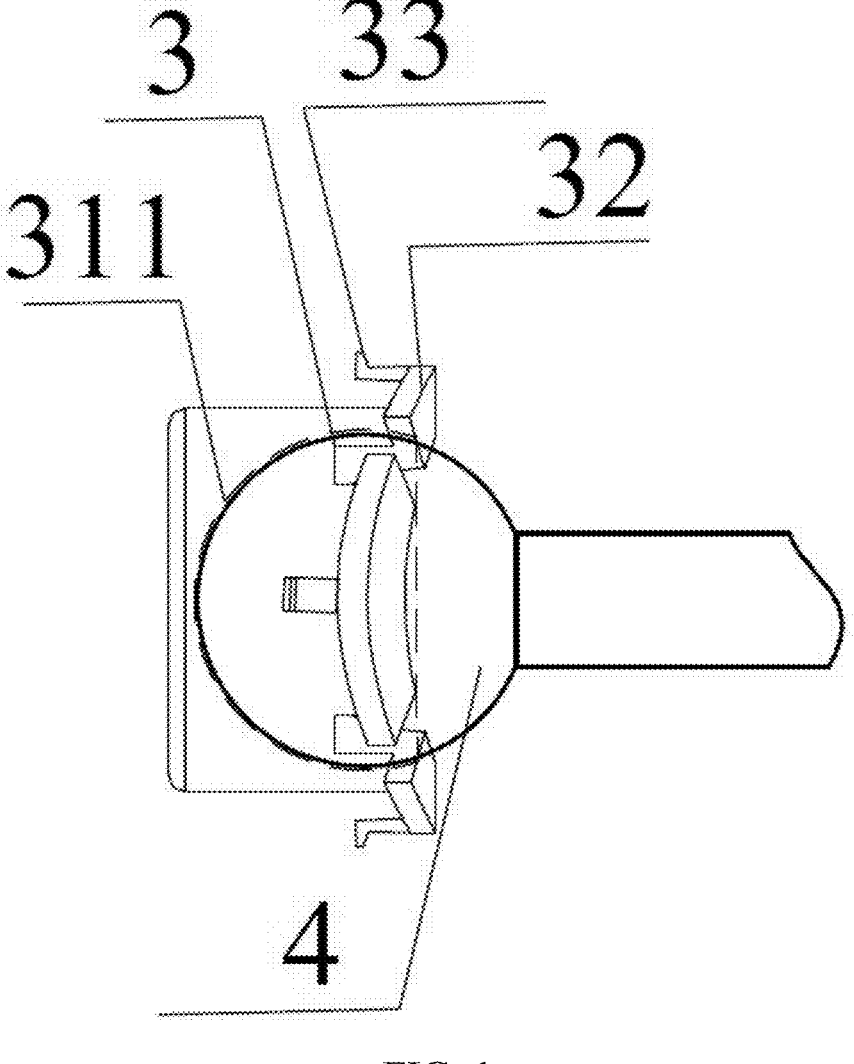
FIG. 1 is a structural diagram of a lamp head connection structure according to the present disclosure.

Reference Numerals: 1. lamp head; 2. lamp body; 3. connection seat; 4. sphere; 11. through-hole; 12. arc-shaped platform; 21. main lamp post; 22. branch lamp post; 31. clamping part; 32. limiting part; 33. locking member; 311. spherical recess structure; 312. first notch; 321. arc-shaped portion.

DETAILED DESCRIPTION OF THE EMBODIMENTS

The technical solutions in the embodiments of the present disclosure are clearly and completely described below with reference to the drawings in the embodiments of the present disclosure. All other embodiments obtained by a person of ordinary skill in the art based on embodiments of the present disclosure without creative efforts shall fall within the protection scope of the present disclosure.

Figure 2:
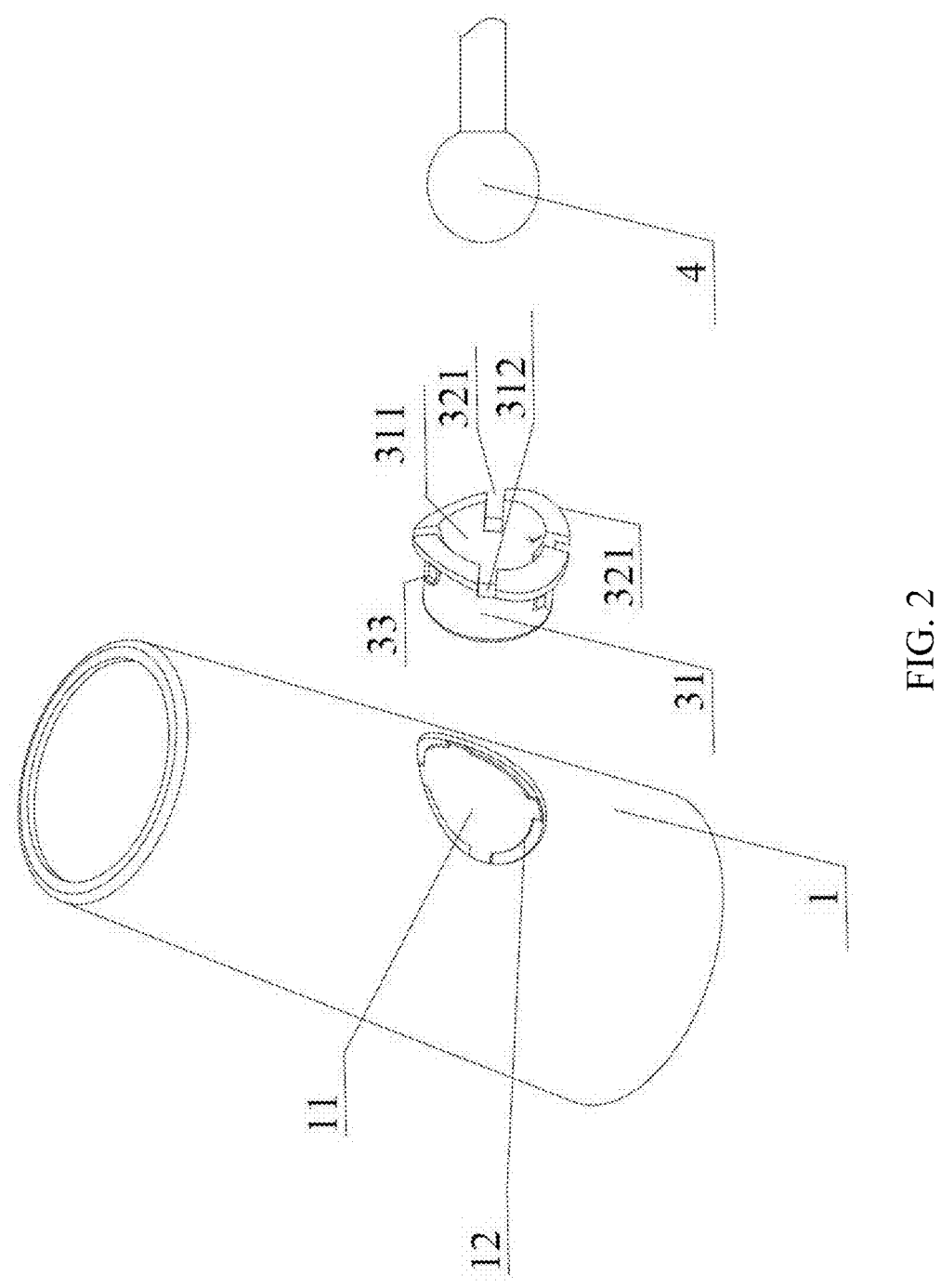
FIG. 2 is an exploded view of a lamp head according to the present disclosure.
Figure 3:
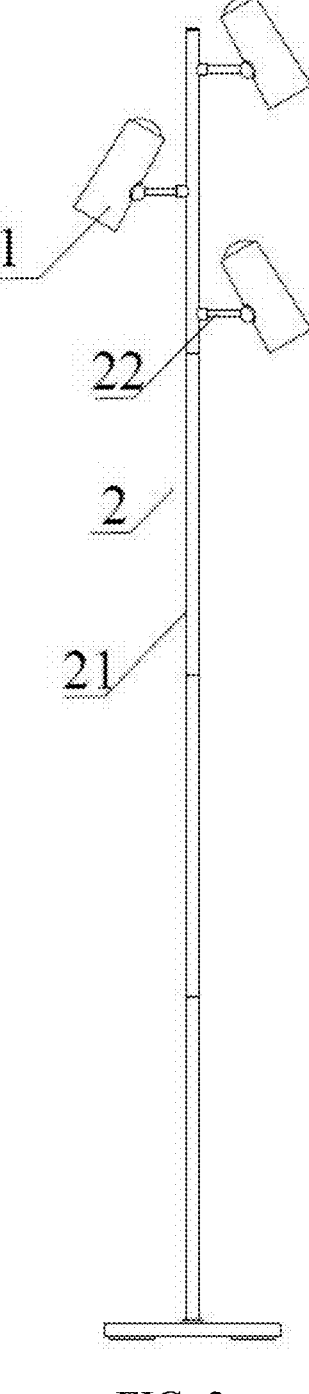
FIG. 3 is a connection diagram of a tree lamp according to the present disclosure.

As shown in FIGS. 1 to 3, a lamp head connection structure includes a connection member located on lamp body 2 and connection seat 3 located on lamp head 1. The connection seat 3 is provided with spherical recess structure. The connection member is sphere 4 that is compatible with the spherical recess structure 311. An inner diameter of the spherical recess structure 311 is larger than a diameter of the sphere 4, and an opening diameter of the spherical recess structure 311 is smaller than the diameter of the sphere 4. The connection member is embedded inside the spherical recess structure 311. The lamp head 1 is rotatable 360° relative to the lamp body 2. In this embodiment, the inner diameter of the spherical recess structure 311 is 20.5 mm, the diameter of the sphere 4 is 20 mm, and the opening diameter of the spherical recess structure 311 is 19 mm. Of course, in other embodiments, these dimensions can be set to other values as long as the sphere 4 can enter the spherical recess structure 311 without detaching on its own. In this way, the sphere 4 is rotatable 360° within the spherical recess structure without detaching on its own, and the lamp body 2 and the lamp head 1 are detachably connected, saving space and facilitating transportation.

In this embodiment, the connection seat 3 is embedded inside the lamp head 1. An outer side of the connection seat 3 is shaped the same as an outer side of a lamp head housing where the connection seat is located. In this way, the outer side of the connection seat 3 matches the outer side of the lamp head housing, ensuring the overall beauty of the lamp head 1. In other embodiments, the outer side of the connection seat 3 may protrude from the lamp head housing or be recessed relative to the lamp head housing.

The connection seat 3 includes clamping part 31 provided with the spherical recess structure 311. The clamping part 31 is a cylinder in shape. The spherical recess structure 311 extends from an upper end surface of the cylinder towards an interior of the cylinder. The lamp head housing is provided with through-hole 11 with a same contour as an outer peripheral side of an open end of the spherical recess structure. A diameter of the through-hole 11 is larger than the opening diameter of the spherical recess structure. The outer peripheral side of the open end of the spherical recess structure is provided with a limiting part. An inner wall of the through-hole 11 is provided with a support platform. When the clamping part 31 is inserted into the through-hole 11, the limiting part is placed on the support platform, and an upper end surface of the limiting part is located inside the outer side of the lamp head housing. The limiting part is an irregular limiting ring. The limiting part and the clamping part 31 are integrally formed. In this way, the clamping part 31 is first connected to the lamp head 1, and then the sphere 4 is inserted into the clamping part 31, ultimately achieving a 360° rotatable connection between the lamp body 2 and the lamp head 1.

A side wall of the clamping part 31 is provided with multiple first notches spaced in a circumferential direction and extending from top to bottom, and the limiting part is correspondingly provided with multiple sets of second notches, dividing the limiting part into multiple arc-shaped portions. The first notch of the limiting part is opposite to and communicated with the second notch of the clamping part 31. In this way, when the sphere 4 is inserted into the spherical recess structure 311, due to the presence of the notches, the arc-shaped portion moves outward, making it easy for the sphere 4 to be embedded in the spherical recess structure 311 and for the sphere 4 to be removed from the spherical recess structure 311.

The support platform includes multiple arc-shaped platforms 12. The multiple arc-shaped platforms 12 are arranged at equal intervals in a circumferential direction. A length of the arc-shaped portion is greater than the interval between each two adjacent arc-shaped platforms 12. An outer wall of each of the arc-shaped portions is provided with locking member 33. The locking member 33 is provided with an L-shaped longitudinal section, including a vertical portion parallel to a central axis of the clamping part 31 and a horizontal portion extending away from the clamping part 31. The locking member 33 enters into the lamp head 1 from a position between two adjacent arc-shaped platforms 12 and is clamped inside the lamp head housing. In this way, the horizontal portion of the locking member 33 is clamped inside the lamp head housing, such that the connection seat 3 is connected to the lamp head 1.

A lamp head 1 includes a lamp head housing, a lamp base, and a light source module located on the lamp base. The lamp base and the light source module are located inside the lamp head housing. The lamp head 1 further includes connection seat 3 located on the lamp head housing. The connection seat 3 is the connection seat 3 of the connection structure of the lamp head 1 in this embodiment.

The present disclosure further provides a lamp. The lamp is a tree lamp with multiple lamp heads 1. The tree lamp includes lamp body 2 and the multiple lamp heads 1. The lamp body 2 includes main lamp post 21 and multiple branch lamp posts 22.

An end of each of the multiple branch lamp posts 22 is provided with the connection member of the connection structure of the lamp head 1 in this embodiment. The lamp head 1 is the aforementioned lamp head 1. The lamp body 2 and the lamp head 1 are connected through the lamp head connection structure in the above embodiment.

Although the embodiments of the present disclosure are illustrated and described above, those of ordinary skill in the art can understand that various changes, modifications, replacements, and alterations may be made to these embodiments without departing from the principle and spirit of the present disclosure, and the scope of the present disclosure is defined by the claims and equivalents thereof.

What is claimed is:

1. A lamp head connection structure, comprising a connection member located on a lamp body and a connection seat located on a lamp head, wherein the connection seat is provided with a spherical recess structure; the connection member is a sphere, wherein the sphere is compatible with the spherical recess structure; the spherical recess structure has an inner diameter larger than a diameter of the sphere and an opening diameter smaller than the diameter of the sphere; and the connection member is embedded inside the spherical recess structure; and the lamp head is rotatable 360° relative to the lamp body, wherein the connection seat is embedded inside the lam head an outer side of the connection seat is shaped the same as an outer side of a lamp head housing where the connection seat is located, wherein the connection seat comprises a clamping part provided with the spherical recess structure; and the spherical recess structure extends from an upper end surface of the clamping part towards a lower part of the clamping part, and the lamp head housing is provided with a through-hole with a same contour as an outer peripheral side of an open end of the spherical recess structure, and the clamping part is inserted into the through-hole and connected to the lamp head housing, wherein a diameter of the through-hole is larger than the opening diameter of the spherical recess structure, and the outer peripheral side of the open end of the spherical recess structure is provided with a limiting part; an inner wall of the through-hole is provided with a support platform, and when the clamping part is inserted into the through-hole, the limiting art is placed on the support platform, and an upper end surface of the limiting part is located inside the outer side of the lamp head housing wherein a side wall of the clamping part is provided with multiple notches spaced in a circumferential direction and extending from top to bottom and the limiting art is correspondingly provided with multiple sets of notches, dividing the limiting part into multiple arc-shaped portions; and the notches of the limiting part are opposite to and communicated with the notches of the clamping part, wherein the support platform comprises multiple arc-shaped platforms, the multiple arc-shaped platforms are arranged at equal intervals in a circumferential direction; and a length of the arc-shaped portion is greater than the interval between each two adjacent arc-shaped platforms, and an outer wall of each of the multiple arc-shaped portions is provided with a locking member, the locking member is provided with an L-shaped longitudinal section comprising a vertical portion parallel to a central axis of the clamping art and a horizontal portion extending away from the clamping part; and the locking member enters into the lamp head from a position between two adjacent arc-shaped platforms and is clamped inside the lam head housing.

2. The lamp head connection structure according to claim 1, wherein the clamping part is a cylinder in shape; and the spherical recess structure extends from an upper end surface of the cylinder towards an interior of the cylinder.

3. The lamp head connection structure according to claim 1, wherein the limiting part is a limiting ring, and the limiting part and the clamping part are integrally formed.

4. The lamp head connection structure according to claim 2, wherein a diameter of the through-hole is larger than the opening diameter of the spherical recess structure; and the outer peripheral side of the open end of the spherical recess structure is provided with a limiting part; an inner wall of the through-hole is provided with a support platform; and when the clamping part is inserted into the through-hole, the limiting part is placed on the support platform, and an upper end surface of the limiting part is located inside the outer side of the lamp head housing.

5. The lamp head connection structure according to claim 3, wherein a side wall of the clamping part is provided with multiple notches spaced in a circumferential direction and extending from top to bottom, and the limiting part is correspondingly provided with multiple sets of notches, dividing the limiting part into multiple arc-shaped portions; and the notches of the limiting part are opposite to and communicated with the notches of the clamping part.

* * * * *